United States Patent [19]

Kiemer

[11] 4,385,335

[45] May 24, 1983

[54] METHOD AND APPARATUS FOR CENTERING MAGNETIC DISKS

[75] Inventor: Ralph F. Kiemer, Akron, Ohio

[73] Assignee: The Steelastic Company, Akron, Ohio

[21] Appl. No.: 172,476

[22] Filed: Jul. 25, 1980

[51] Int. Cl.³ .................... G11B 5/84; B65D 85/30; B65D 85/57; A47G 29/00

[52] U.S. Cl. .................... 360/137; 206/310; 206/444; 211/40

[58] Field of Search .................... 360/97–99, 360/133, 137; 206/310, 444; 211/40

[56] References Cited

U.S. PATENT DOCUMENTS 4,177,491 12/1979 Jahn .................... 360/99

*Primary Examiner*—Robert S. Tupper
*Attorney, Agent, or Firm*—Hamilton, Renner & Kenner

[57] ABSTRACT

A centering device (10) to effect registration of a magnetic disk (11) with respect to the protective envelope (12) within which the disk (11) is encased. The centering device (10) has a receiving locus (28) upon which one face wall (16) of the envelope (12) may be supported. Locating means (30) extend upwardly of the receiving locus (28) to engage at least a portion of two discrete edges (23 and 24) on the envelope (12) and thereby fix the position of the envelope (12) with respect to the receiving locus (28) of the centering device (10). Hub means (35) extend upwardly of the receiving locus (28) at a predetermined location with respect to the locating means (30). The hub means (35) is designed to engage the drive aperture (13) of the disk (11) so as to effect registration of the disk (11) within its envelope (12). One or more recesses (45 and 46) and legs (48) are provided to facilitate grasping of the disk assembly (19) by the operator.

8 Claims, 5 Drawing Figures

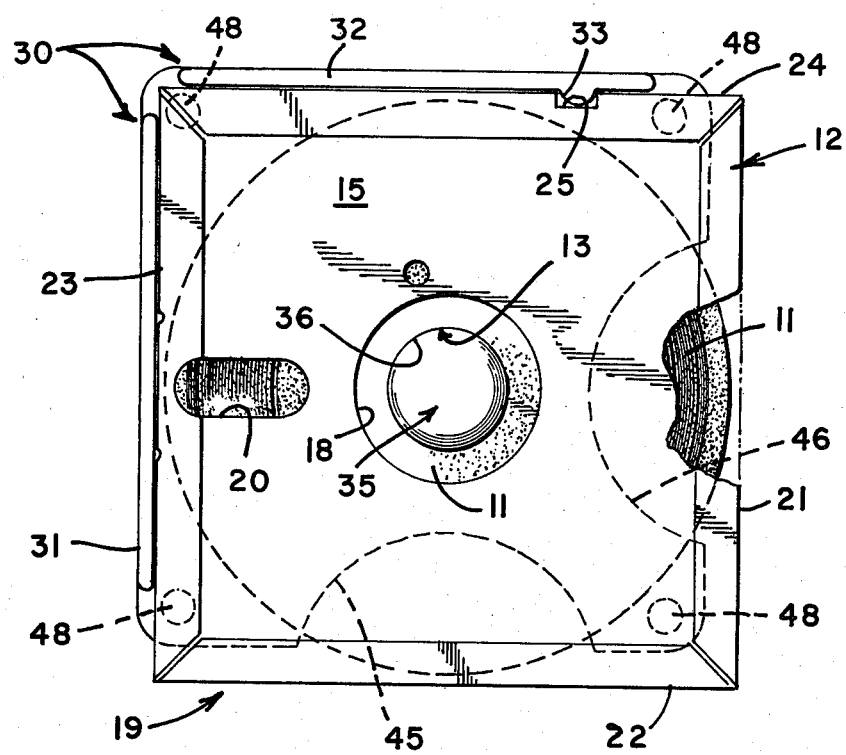
FIG. 3
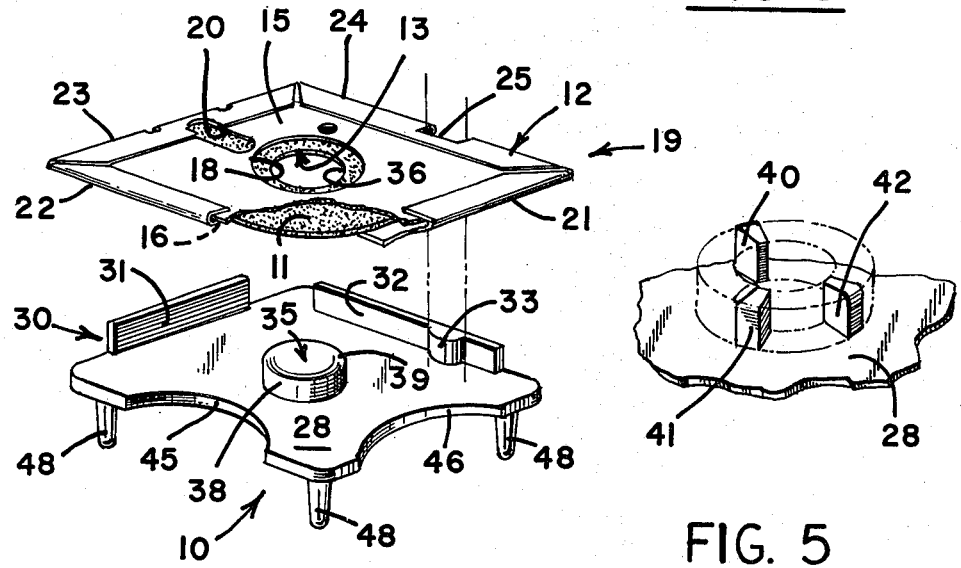
FIG. 4
FIG. 5

METHOD AND APPARATUS FOR CENTERING MAGNETIC DISKS

TECHNICAL FIELD

The present invention relates generally to computers and accessory components for use in conjunction therewith. More particularly, the present invention relates to an accessory to be used in conjunction with devices such as magnetic disks that are intended for the storage of information, data and programs. Specifically, the present invention relates to an auxiliary device, or accessory, that is used to achieve accurate registration of a magnetic disk within its protective casing.

BACKGROUND ART

The increasing use of computers in modern society has led to a corresponding increase in the use of peripheral devices to augment the outside memory available to the computer. A computer basically has two types of memories—ROM (Read Only Memory) and RAM (Random Access Memory). ROM is exemplified by the non-volatile memory that is built into the interpreter portion of the computer to translate the particular language used by the operator into machine language used by the processor.

RAM is exemplified by the volatile memory which stores the program and information that the operator loads into the computer. The amount of information which can be loaded into the computer is limited by the memory capacity of the computer and, to the extent the memory capacity is of a volatile type, may be subject to loss if there is a power failure or if the computer is turned off, either purposely or inadvertently.

Memory can be expanded by the use of peripherals. For example, a tape recorder can be interfaced with the computer and used to effect long-term storage of information. Thus, whatever program, information or other data that can be entered into memory can be preserved for repetitive use by virtue of substantially permanent storage on a relatively inexpensive tape cassette.

Another type of memory storage outside the computer comprises a circular disk of thin plastic coated with magnetic material of the same general type used on cassette tapes. This magnetic disk looks like a flexible, 45 rpm record and is called a "floppy disk."

The disk itself is encased in a protective envelope, generally cardboard, and the combined disk and envelope are insertably received within a disk drive unit. The center of the protective envelope is provided with an access aperture that is concentrically disposed with respect to a drive aperture located in the center of the floppy disk. Jaws within the drive unit engage the drive aperture, through the access aperture in the protective envelope, to rotate the disk within the envelope at speeds of several hundred rpm. Information stored on the disk is transferred to the memory within the computer by virtue of a reading/recording head that is provided in the disk drive unit and positioned in juxtaposition to the disk through an access window in the envelope. Similarly, information within the computer can be transferred to, and stored on, a floppy disk.

Although the floppy disk system is generally more expensive than the cassette system, the transfer of information back and forth between the computer and the floppy disk system occurs at a small fraction of the time required for the cassette system. For example, a program that would require three and a half minutes to load from a cassette could be loaded in less than twenty seconds from a floppy disk system.

All considered, the floppy disk system is a powerful peripheral for a computer. However, there appears to be one major problem encountered by users of the floppy disk system—i.e., random damage to the drive aperture of the disk itself after it has been insertably received within the disk drive unit. Because the disk must be free to rotate within its protective envelope, the inside dimension of the generally square envelope is preferably somewhat greater than the outside diameter of the disk—thus providing some necessary "slop" between the disk and the protective envelope within which the disk is encased.

The slop necessary to assure free rotation of the disk within its protective envelope also permits the disk to move laterally within its envelope when the disk is not received within the drive unit. As such, when the disk assembly is inserted into the drive unit, there is no assurance that the drive aperture in the center of the disk will be accurately registered with the jaws of the drive unit that grasp and rotate the disk within its envelope.

Successive engagement of the disk with the drive jaws when the disk is out of register deteriorates the drive aperture of the disk itself.

DISCLOSURE OF THE INVENTION

It is, therefore, a primary object of the present invention to provide an accessory unit by which preliminarily to center a floppy disk within its protective envelope so that as the latter is insertably received within a disk drive unit the disk will register with the jaws within the disk drive.

It is another object of the present invention to provide an accessory unit, as above, which would increase the useful life of the floppy disk by obviating damage occasioned by misregistration of the drive aperture in the disk with the engaging jaws of the drive unit.

It is a further object of the present invention to provide an accessory unit, as above, by which to effect registration of the floppy disk within its protective envelope without necessitating having the operator actually touch the disk itself.

It is a still further object of the present invention to provide a method for centering a magnetic disk with respect to the protective envelope within which the disk is encased.

These and other objects, together with the advantages thereof over existing and prior art forms which will become apparent from the following specification, are accomplished by means hereinafter described and claimed.

The present invention ovecomes the problems of damage to the drive aperture in the floppy disk by effecting registration of the floppy disk within its protective envelope prior to insertion of the floppy disk assembly into a disk drive unit. The centering device employed to affect this result comprises a flat supporting locus onto which a face of the protective envelope may be received. A plurality of locating means extend outwardly of the receiving locus to engage at least a portion of two, discrete edges on the envelope and thereby assure a predetermined disposition of the envelope with respect to the supporting locus of the centering device.

A hub also extends outwardly of the receiving locus to engage the drive aperture of the floppy disk. The hub is so disposed with respect to the locating means that the hub will register the floppy disk with respect to the envelope within which the disk is encased. So registered, an operator may grasp the disk assembly (the disk and the protective envelope within which the disk is encased) with his hands and squeeze the flexible envelope to pinch the disk in fixed position with respect to the envelope while the disk assembly is still mounted on the centering device. By maintaining the disk pinched between the opposed face walls of the envelope, the assembly may be removed from the centering device and inserted into a disk drive unit with the disk registered with respect to the envelope, thus obviating the situation which leads to deterioration of the disk as it is engaged by the jaws of the disk drive unit.

The method comprises the steps of locating the envelope precisely with respect to an external frame of reference and shifting the disk with respect to the envelope solely by engaging the drive aperture of the disk. Thereafter the envelope is squeezed to pinch the disk in its registered position. The pinched state is then maintained until the disk assembly is inserted into a disk drive unit.

One preferred structural embodiment is shown by way of example in the accompanying drawings and described in detail so as to also fully disclose the method, but without attempting to show all of the various forms and modifications in which the invention might be embodied; the invention being measured by the appended claims and not by the details of the specification.

BRIEF DESCRIPTION OF THE DRAWINGS

FIG. 3 is a top plan view similar to FIG. 1 but depicting a disk assembly mounted on the centering device so as to center the disk with respect to the protective envelope within which the disk is encased;

FIG. 4 is an exploded perspective of the arrangement depicted in FIG. 3; and,

FIG. 5 is a partial perspective of a centering device incorporating an alternative form of hub means.

PREFERRED MODE FOR CARRYING OUT THE INVENTION

Figure 1:
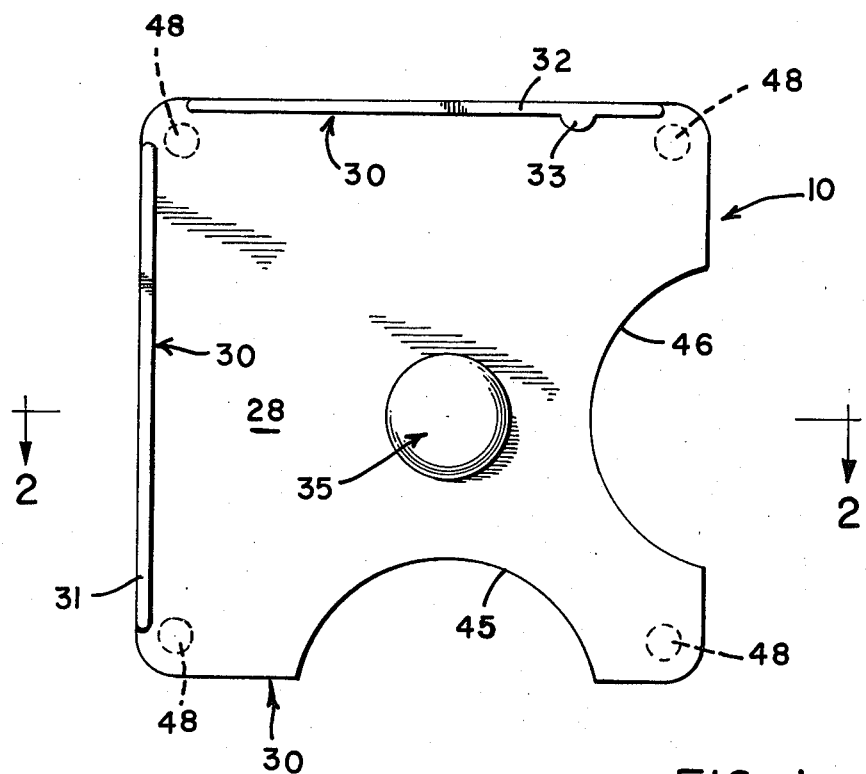
FIG. 1 is a top plan view of a centering device embodying the concept of the present invention.
Figure 2:
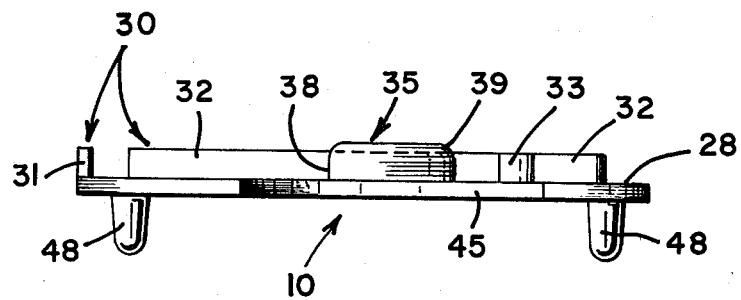
FIG. 2 is a side elevation taken substantially along line 2—2 of FIG. 1.

A centering device embodying the concept of the present invention is designated generally by the numeral 10 on the drawings and is intended to register a floppy disk 11 within the protective envelope 12 in which the floppy disk is encased.

The floppy disk 11 is circular and has a central drive aperture 13. At the present state of the art, floppy disks 11 are generally flexible and are covered with a magnetic material suitable for storing programs, information and other data in machine language.

In order to protect the floppy disk against abrasion, dirt and even human skin oils from the fingers of the operator, the disk 11 is normally encased within a flat envelope 12 that may well be fabricated from heavy paper or cardboard. The opposed face walls 15 and 16 of envelope 12 are each provided with an access aperture 18 that is preferably of larger diameter than the drive aperture 13 in order to permit facile access to the drive aperture 13 by the jaws of a disk drive unit (not shown) into which the disk assembly 19—comprising the disk 11 and envelope 12 within which the disk is encased—is inserted for operation.

The envelope 12 is also provided with an access window 20 to permit access to the disk 11 by a reading/recording head (not shown) when the assembly 19 is operatively received within a disk drive unit. The peripheral edges 21, 22, 23 and 24 of the envelope 12 are rectilinear, and because the disk 11 which rotates within the envelope 12 is circular, the peripheral edges of the envelope preferably delineate a square.

At least one orienting notch 25 is provided along the edge 24 and must be engaged by a trip finger (not shown) within the disk drive unit before the reading/recording head will move into juxtaposition with the disk, thereby assuring that the square, disk assembly 19 is inserted within the disk drive unit in such a way that the access window 20 is properly disposed with respect to the location of the reading/recording head within the drive unit.

Because the disk 11 must freely rotate within the envelope 12, the outer diameter of the disk 11 must be of lesser dimension than the inner span between the opposed rectilinear edges 21 and 23 as well as 22 and 24 of the envelope 12. Accordingly, the disk 11 is also free to move laterally within the envelope 12, and as a result the drive aperture 13 will not remain exactly centered with respect to the envelope 12 as the assembly 19 is stored and/or handled. Repeated insertions of assembly 19 into a disk drive unit without having the drive aperture 13 properly centered with respect to the envelope 12 permits the jaws which engage the disk 11 within the drive unit to degrade the circumferential periphery of the drive aperture 13.

The few seconds required to use the centering device 10 obviates the deleterious affect incident to allowing the jaws of the drive unit to grasp the drive aperture 13 when the latter is not centered with respect to the envelope 12.

The centering device 10 has a planar receiving locus, or surface, 28 upon which face 16 of the envelope 12 may be supported. Locating means 30 extend upwardly of the receiving locus 28 to engage at least a portion of two discrete edges on the envelope. In the exemplary embodiment depicted in the drawings the locating means 30 may comprise a pair of flanges 31 and 32 which extend along, and comprise, two raised borders of the receiving locus 28. To accommodate a square envelope 12, the flanges 31 and 32 are perpendicular with respect to each other.

Engagement of two adjacent and discrete edges 23 and 24 of the envelope 12 with the flanges 31 and 32, respectively, absolutely fixes the position of the envelope 12 supported on the receiving locus 28, and in order to assure a consistent orientation of the access aperture 18 on successive envelopes as they are positioned on the centering device 10, an index, or determination, lug 33 extends laterally from the flange 32 to be received in the orienting notch 25 when the assembly 19 is properly disposed with respect to the centering device 10.

Because there is only one orienting notch 25, and further because that notch is located at a point other than the midpoint of edge 24, there is only one possible disposition in which the envelope 12 can be received on the receiving locus 28, and that is when not only the lug 33 is received within the orienting notch 25 but also when only face 16 of the envelope 12 engages the receiving locus 28.

A hub means 35 extends upwardly of the receiving locus 28, and at a precisely preselected location with respect to the flanges 31 and 32. Specifically, the hub means 35 must be concentric to the arc to which the flanges 31 and 32 are tangential. The radius of that arc is carefully selected to be equal to the radius of the disk plus the dimension between the outer circumference of the disk and the adjacent edge of the envelope 12 when the disk is centered within that envelope.

The configuration of the hub means itself is not critical so long as it is capable of facile insertion into the drive aperture 13 and will thereupon engage a sufficient portion of the circumferential rim 36 of the drive aperture 13 to be capable of shifting the location of the disk within the envelope to effect registration therebetween. In the preferred embodiment the hub means is depicted as a cylindroidal shaft 38 projecting perpendicularly outwardly of the receiving locus 28 and terminating in a rounded rim 39. The rounded rim 39 facilitates entry of the hub means 35 into the drive aperture 13, and the outer diameter of the cylindroidal shaft 38 is substantially equal to the inner diameter of the drive aperture 13. As such, when the envelope 12 engages the locating means 30, when the face 16 of the envelope 12 lies flat upon the receiving locus 28 and when the hub means 35 engages the drive aperture 13, the disk 11 is properly registered within the envelope 12.

From the foregoing explanation it should be apparent that a number of distinct configurations could be employed to provide a satisfactory hub means. For example, the shaft could be discontinuous rather than fully cylindrical, so long as the hub means would engage the drive aperture at a plurality of locations spaced peripherally of the drive aperture. In this regard one could well employ two, or preferably three, ribs for the hub means as shown in FIG. 5.

With reference to FIG. 5 a pair of diametrically opposed ribs could suffice, but were simple ribs to be employed, at least three ribs 40, 41 and 42 would be preferred, and for the optimal results they should be spaced approximately 120° apart, as shown.

Once the disk 11 is centered within its protective envelope 12 the operator simply grasps the opposite face walls 15 and 16 of the envelope 12 between his, or her, fingers to pinch the disk between the face walls 15 and 16, removes the assembly 19 from the centering device 10 and inserts the assembly 19 into a disk drive unit.

In order to facilitate grasping of the assembly 19 in the required manner by the operator, a recess is provided along at least one edge of the receiving locus 28, and preferably on an edge opposite the locating means 30. As depicted, a recess 45 may be provided in edge 22. In fact, a recess 46 may also be provided in edge 21 to facilitate grasping of assembly 19 by either, or both, hands.

Finally, grasping of the assembly 19 is further facilitated by elevating the level of receiving locus 28 a comfortable distance above the surface on which the centering device reposes. This may be readily accomplished by supporting the device on a plurality of legs 48, one depending from beneath each corner of the receiving locus 28.

In view of the foregoing description it should be apparent that a centering device embodying the concept of the present invention not only provides an effective and uncomplicated means by which to center a floppy disk within its protective envelope, and without the necessity of having the disk itself be touched by human hands, in order to obviate damage to the disk occasioned by misregistration of the disk within its protective envelope but also otherwise accomplishes the objects of the invention.

I claim:

1. A device for centering a circular, magnetic disk of a disk assembly prior to inserting the disk assembly into a disk drive unit, the magnetic disk having a central drive aperture within a protective envelope having rectilinear edges and opposed, planar face walls, the face walls of the envelope being provided with at least an access aperture generally larger than the drive aperture of the magnetic disk to permit ready access to the drive aperture in the disk encased within the envelope, said centering device comprising a flat supporting locus to receive either face wall of the protective envelope in which the magnetic disk is encased, a plurality of locating means extending upwardly from said receiving locus and oriented to engage at least a portion of two discrete edges of said envelope and thereby assure a predetermined disposition of said envelope with respect to said receiving locus, hub means extending upwardly of said receiving locus, said hub means substantially simultaneously engaging the drive aperture in the magnetic disk in at least a plurality of locations spaced peripherally of the drive aperture, said hub being centered with respect to said locating means such that when a protective envelope engages said locating means, the hub will register the magnetic disk engaged thereby with the envelope within which the disk is received.

2. A device, as set forth in claim 1, in which said hub means engages the drive aperture in at least three locations spaced approximately 120° along the periphery of the drive aperture.

3. A device, as set forth in claim 1, in which the drive aperture is circular and in which said hub means comprises a cylindrical projection, said cylindrical projection having an outer diameter substantially equal to the inner diameter of the drive aperture in the magnetic disk.

4. A device, as set forth in claim 3, in which a recess is provided along at least one edge of said receiving locus to permit facile access to the opposite face walls of the envelope received thereon.

5. A device, as set forth in claim 4, in which a plurality of leg means extend outwardly on the receiving locus in a direction opposite to that which the locating means extend from said receiving locus.

6. A centering device, as set forth in claim 5, in which the locating means comprise at least a pair of flanges oriented perpendicularly with respect to each other.

7. An orienting device, as set forth in claim 6, in which an orienting notch is provided along one edge of the envelope and a determination lug extends laterally of one said locating flange to engage the orienting notch.

8. A method for centering a magnetic disk with respect to the protective envelope within which the disk is encased comprising the steps of:
positioning the disk assembly on the centering device;
precisely locating the envelope with respect to a predetermined external frame of reference;
shifting the disk with respect to the envelope solely by engaging the drive aperture of the magnetic disk to effect registration therebetween;
squeezing the envelope to pinch the disk in its registered position within the envelope; and,
maintaining the disk pinchedly squeezed by the envelope until the disk and envelope assembly is inserted into a disk drive unit.

* * * * *